United States Patent
Zhang et al.

(10) Patent No.: US 11,276,436 B1
(45) Date of Patent: Mar. 15, 2022

(54) CORROSIVE GAS REDUCTION FOR ELECTRONIC DEVICES

(71) Applicant: Seagate Technology LLC, Fremont, CA (US)

(72) Inventors: Li Hong Zhang, Singapore (SG); Xiong Liu, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/141,377

(22) Filed: Jan. 5, 2021

(51) Int. Cl.
| | | |
|---|---|---|
| *G11B 33/14* | (2006.01) | |
| *G11B 33/02* | (2006.01) | |
| *G11B 25/04* | (2006.01) | |
| *F16J 15/10* | (2006.01) | |
| *F16J 15/06* | (2006.01) | |

(52) U.S. Cl.
CPC ......... *G11B 33/1466* (2013.01); *F16J 15/064* (2013.01); *F16J 15/102* (2013.01); *F16J 15/104* (2013.01); *G11B 25/043* (2013.01); *G11B 33/022* (2013.01); *G11B 33/1446* (2013.01)

(58) Field of Classification Search
None
See application file for complete search history.

(56) References Cited

U.S. PATENT DOCUMENTS

| | | | |
|---|---|---|---|
| 3,977,950 A | 8/1976 | Tortil | |
| 5,582,411 A | 12/1996 | Tyler | |
| 6,312,550 B1 | 11/2001 | Tiburtius et al. | |
| 6,626,439 B1 * | 9/2003 | Forry | F16J 15/104 277/592 |
| 9,456,513 B2 | 9/2016 | Charles et al. | |
| 9,508,393 B1 * | 11/2016 | Le | G11B 33/1466 |
| 9,702,464 B1 * | 7/2017 | Busby | F16J 15/02 |
| 9,818,453 B1 * | 11/2017 | Lapp | G11B 33/1466 |
| 10,115,436 B1 | 10/2018 | Zhang et al. | |
| 10,622,027 B1 * | 4/2020 | Kaneko | G11B 25/043 |
| 2004/0099987 A1 * | 5/2004 | Imai | B29C 48/12 264/177.1 |
| 2005/0206093 A1 * | 9/2005 | Utsunomiya | B29C 48/09 277/628 |
| 2006/0291095 A1 * | 12/2006 | Inoue | G11B 33/12 360/99.2 |
| 2007/0052125 A1 | 3/2007 | Kalinoski et al. | |
| 2007/0278909 A1 * | 12/2007 | Xu | G11B 33/1446 310/68 R |
| 2009/0244769 A1 | 10/2009 | Dai et al. | |
| 2011/0073344 A1 | 3/2011 | Zhang et al. | |

(Continued)

OTHER PUBLICATIONS

Georgiadis et al., "Removal of Hydrogen Sulfide From Various Industrial Gases: A Review of The Most Promising Adsorbing Materials," Catalysts, 2020, vol. 10, 521, doi:10.3390/catal10050521, 36 pages.

(Continued)

*Primary Examiner* — Jefferson A Evans
(74) *Attorney, Agent, or Firm* — Faegre Drinker Biddle & Reath LLP

(57) ABSTRACT

A device includes a cover and a base. The base is coupled to the cover to create an enclosure. The device also includes a form-in-place-gasket. The form-in-place-gasket is positioned between the cover and the base to create a seal. The form-in-place-gasket includes an acid-absorbing material.

19 Claims, 5 Drawing Sheets

(56) References Cited

U.S. PATENT DOCUMENTS

| | | | | |
|---|---|---|---|---|
| 2011/0141618 A1* | 6/2011 | Wallash | ............ | G11B 33/1466 |
| | | | | 360/99.22 |
| 2015/0009789 A1* | 1/2015 | Freeman | ............ | G11B 33/1466 |
| | | | | 369/75.11 |
| 2017/0368764 A1* | 12/2017 | Busby | .................... | F16J 15/065 |
| 2018/0374509 A1* | 12/2018 | Amin-Shahidi | ..... | G11B 33/125 |
| 2019/0040954 A1* | 2/2019 | Wei | ............................ | C08J 7/05 |
| 2019/0147917 A1* | 5/2019 | Yap | .................... | G11B 23/0326 |
| | | | | 312/223.2 |
| 2020/0118601 A1* | 4/2020 | Lee | .................... | G11B 33/1453 |
| 2020/0192043 A1* | 6/2020 | Geens | ................ | H02G 15/013 |
| 2020/0255809 A1* | 8/2020 | Boyle | .................... | A61K 38/44 |

OTHER PUBLICATIONS

Namiki et ai,, "Surface Corrosion of HDD Media and Subsidiary Particle Formation Due to SO2 Gas Adsorption," Journal of the IEST, 2007, vol. 50, No. 2, pp. 38-51.

Shah, Hardik, "Gaseous Corrosion in Hard Disk Drive: A Computational Study," Thesis for Master of Science in Mechanical Engineering at The University of Texas at Arlington, May 2013, 68 pages.

\* cited by examiner

CORROSIVE GAS REDUCTION FOR ELECTRONIC DEVICES

SUMMARY

In certain embodiments, a device includes a cover, a base coupled to the cover to create an enclosure, and a form-in-place-gasket positioned between the cover and the base to create a seal. The form-in-place-gasket includes an acid-absorbing material.

In certain embodiments, a device includes a cover, a base coupled to the cover to create an enclosure, and a gasket positioned between the cover and the base to create a seal. The gasket includes a base material and a filler that comprises silica gel.

In certain embodiments, a method for forming a sealed enclosure between a cover and a base of an electronic device is disclosed. The method includes dispensing an uncured first gasket material to the cover and/or the base. The first gasket material includes a base material and a first filler with an acid-absorbing material. The method further includes dispensing an uncured second gasket material to the cover and/or the base. The second gasket material includes the base material and a second filler. The method further includes coupling the cover to the base to create the sealed enclosure.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
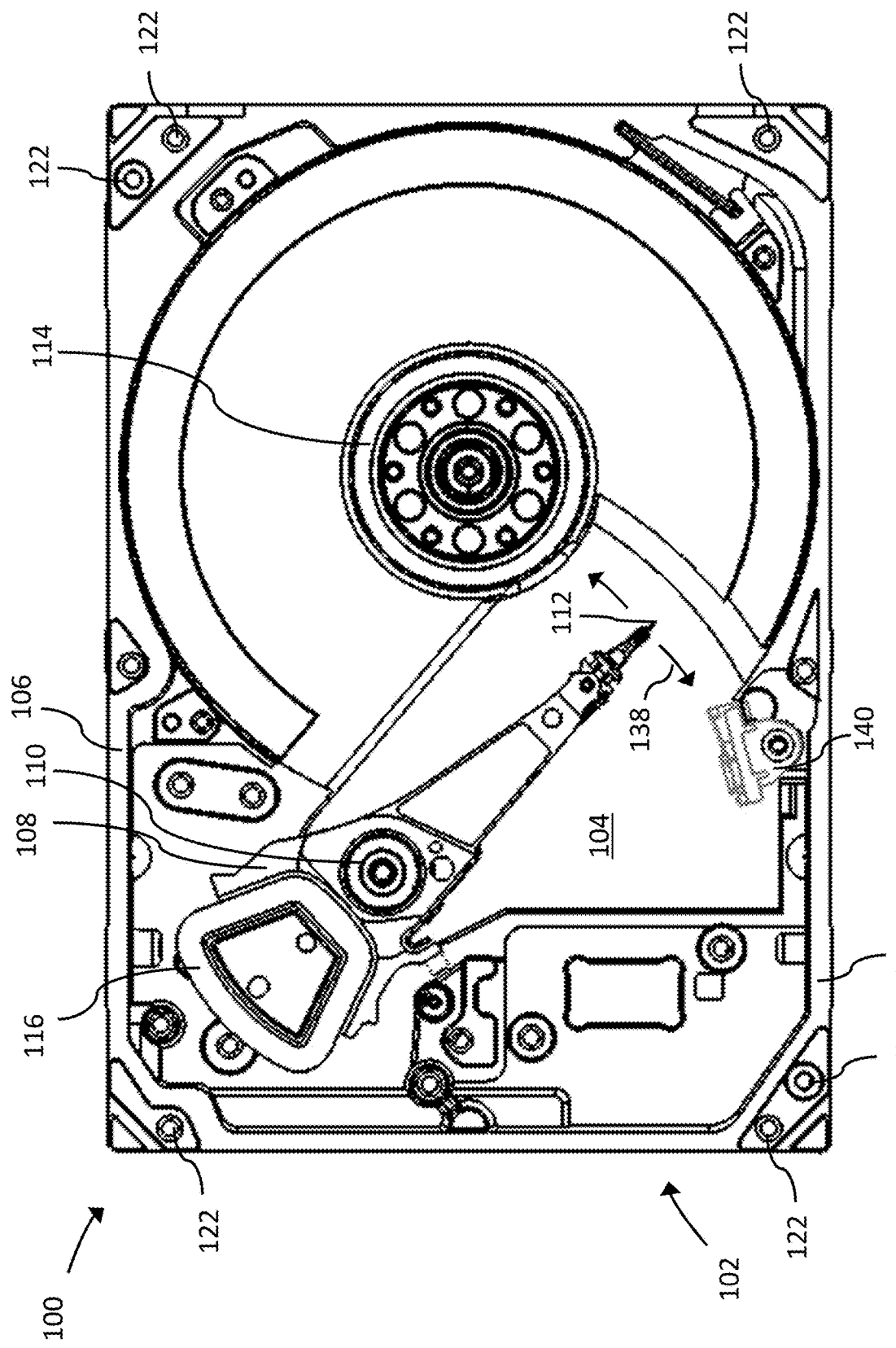
FIG. 1 shows a top view of portions of a hard disk drive, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

Devices such as data storage devices (e.g., hard disk drives) are sometimes operated in environments that contain corrosive elements such as acidic gases. These elements can corrode components of the devices such hard disk drives' magnetic recording media and read/write heads. Certain embodiments of the present disclosure are accordingly directed to reducing the amount of corrosive elements entering devices (e.g., electronic devices such as data storage devices). In particular, certain embodiments of the present disclosure are directed to incorporating one or more materials into gaskets that absorb corrosive materials.

FIG. 1 shows a portion of a hard disk drive 100. Although the description uses a hard disk drive 100 as an exemplary device, the features for reducing the effect of corrosive materials can be incorporated into other types of devices.

The hard disk drive 100 includes a base deck 102 with a base member or a floor 104 with sidewalls 106 that form an internal cavity in which various hard disk drive components are positioned. As shown in FIG. 1, the sidewalls 106 extend around a periphery of the floor 104. When the hard disk drive 100 is assembled, a cover—an example of which is shown in FIG. 2—is coupled to the base deck 102 to enclose the hard disk drive components within the internal cavity.

FIG. 1 shows the hard disk drive 100 with an actuator assembly 108, which can rotate around a pivot bearing 110. The actuator assembly 108 positions read/write heads 112 over data tracks on magnetic recording media (not shown). During operation, a spindle motor 114 rotates the magnetic recording media while the actuator assembly 108 is driven by a voice coil motor assembly (a coil portion 116 of which is shown in FIG. 1) to pivot around the pivot bearing 110. As the read/write heads 112 follow a travel path over the magnetic recording media, the read/write heads 112 write data to the magnetic recording media by generating and emitting a magnetic field towards the magnetic recording media which induces magnetically polarized transitions on the desired data track on the magnetic recording media. The magnetically polarized transitions are representative of the data. The read/write heads sense (or "read") the magnetically polarized transitions with a magnetic transducer. As the magnetic recording media rotates adjacent the read/write heads 112, the magnetically polarized transitions induce a varying magnetic field into a magnetic transducer of the read/write heads 112. The magnetic transducer converts the varying magnetic field into a read signal that is delivered to a preamplifier and then to a read channel for processing to be used by a host system (e.g., server, laptop computer, desktop computer).

Figure 2:
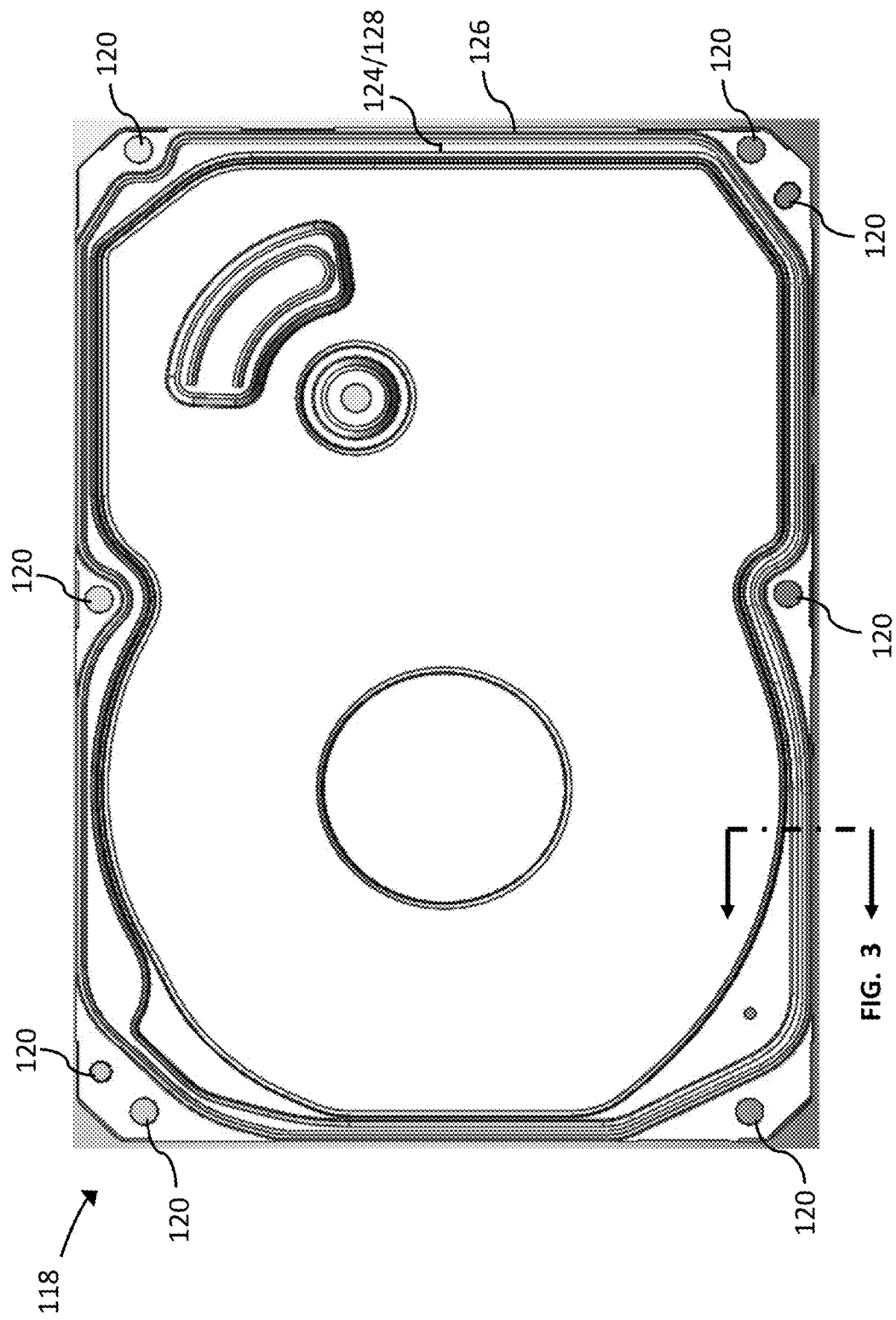
FIG. 2 shows a bottom view of a top cover for coupling to the hard disk drive of FIG. 1, in accordance with certain embodiments of the present disclosure.

FIG. 2 shows a bottom side of a cover 118 that can be coupled (e.g., via fasteners such as screws) to the base deck 102 to create an enclosure or internal cavity. When the cover 118 is coupled to the base deck 102, the bottom surface of the cover 118 faces the base deck 102. The cover 118 can include openings 120 through which the fasteners extend within and then couple to openings 122 (shown in FIG. 1) in the base deck 102. Before the cover 118 is coupled to the base deck 102 via the fasteners, a gasket 124 can be positioned on the cover 118 near an outer periphery 126 of the cover 118.

In certain embodiments, the gasket 124 is a form-in-place gasket (FIPG) that is applied to the cover 118 in an uncured state and that later cures such that it is adhered to the cover 118. When the cover 118 is positioned between the base deck 102 and the cover 118, the gasket 124 helps provide a seal (e.g., an air-tight seal) to help prevent contaminants from entering the enclosure of the hard disk drive 100. In certain embodiments, the gasket 124 is continuous along an entire periphery of the base deck 102 and/or the cover 118.

As noted above, performance of devices like the hard disk drive 100 can be degraded by corrosive elements such as acidic gases like sulfur dioxide, hydrogen halogen, hydrogen sulfide, and nitrous oxide. Acidic gases can accelerate corrosion of the read/write heads 112 and magnetic recording media, which have relatively thin protective coatings in order to allow the magnetic components of the read/write heads 112 and the magnetic recording media to be positioned close to each other.

One path for corrosive elements to enter the internal cavity of hard disk drives is through the gasket positioned in the small opening between the base deck and top cover of hard disk drives. Because acidic gases can be comprised of small molecules, the gases can gradually leak into the internal cavity through the gasket. For example, typical gasket materials (e.g., rubber-based materials) have pore sizes ranging from 5 to 220 micrometers. Because the size of molecules of acidic gases can be less than those pore sizes, the acidic gas molecules can gradually leak into the internal cavity through the gasket. Certain embodiments of the present disclosure involve positioning an acidic-absorbing material between base decks and top covers.

Figure 3:
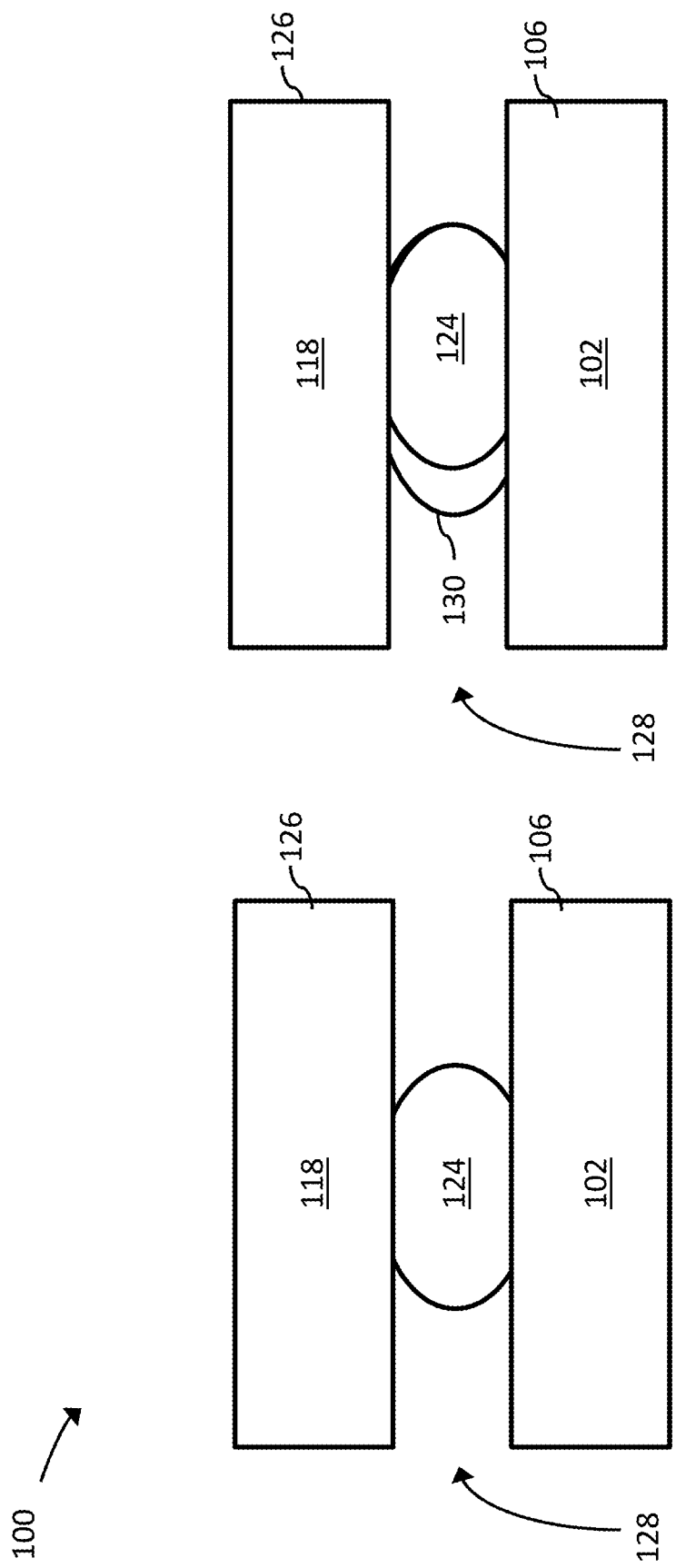
FIG. 3A and FIG. 3B show cutaway, side views of a portion of the hard disk drive of FIG. 1 and the top cover of FIG. 2 and a gasket therebetween, in accordance with certain embodiments of the present disclosure.

FIG. 3A shows a side, cutaway view of the gasket 124 positioned between the base deck 102 (e.g., an upper surface of the sidewalls 106) and the cover 118 (e.g., a lower surface of the cover 118) to create a seal. As noted above, the gasket 124 can be an FIPG that is dispensed and applied to the cover 118 in an uncured state and that later cures. The gasket 124 can comprise a base material such as rubber-based materials like silicone rubber or urethane acrylate rubber. The base material can be mixed with a filler, which can include a fumed silica. Fumed silica acts as a thixotropic agent used to improve the mechanical property and manufacturability of the base material of the gasket 124. However, the base material and the fumed silica generally have little to no effect on preventing corrosive elements from passing through the gasket 124.

To help reduce the amount of corrosive elements passing through the gasket 124 and into an internal cavity 128 of the hard disk drive 100, the gasket 124 can include one or more acid-absorbing materials, which can be considered to be part of the filler mixed with the base material. The one or more acid-absorbing materials can be capable of absorbing molecules of materials such as sulfur dioxide, hydrogen halogen, hydrogen sulfide, and nitrous oxide.

In certain embodiments, the acid-absorbing material comprises a silica gel. The silica gel can comprise fine particles that are mixed with the filler material(s) such as the fumed silica of the gasket 124. In other embodiments, the acid-absorbing material comprises molecular sieves. In certain embodiments, such as embodiments represented by FIG. 3A, the acid-absorbing material can be uniformly distributed within the base material and therefore the gasket 124. The filler containing the acid-absorbing material can be mixed with the base material prior to dispensing the mixed gasket material.

The acid-absorbing material can comprise a porous material that has pores with diameters large enough to absorb or trap molecules of acidic gases. The acidic-absorbing materials can also be hydrophilic materials, so they tend to absorb water molecules on their surfaces. As molecules of an acidic gas attempt to pass into the gasket 124, the molecules may enter the pores and become bonded with water molecules of the surfaces of the acid-absorbing material. Materials such as silica gel have water molecules that can bond with molecules of acidic gases.

In certain embodiments, the acid-absorbing material has pores with diameters up to 5 nm (e.g., 3-5 nm) in size. In certain embodiments, the acid-absorbing material has a pore volume of 0.70-0.80 $m^3/g$. In certain embodiments, the acid-absorbing material has a surface area of 500-800 $m^2/g$.

In certain embodiments, the silica gel or molecular sieves are coated with an alkaline material. For example, the alkaline material can comprise sodium or potassium (e.g., sodium carbonate, potassium carbonate, sodium hydroxide, or potassium hydroxide). The addition of the alkaline coating can further increase efficiency and capacity of absorption of molecules of acidic gases.

In certain embodiments, the filler of the gasket 124 comprises 10-50% of the acid-absorbing material (e.g., silica gel) by weight. The rest of the filler can be comprised of the fumed silica and alkaline material. The filler can make up 5-12% (e.g., approximately 9%) of the material of the gasket 124, with the remaining portion comprising the base material. As such, 0.5-6% of the gasket material (by weight) can be made of the acid-absorbing material.

In embodiments where the acid-absorbing material comprises molecular sieves, the surfaces of the sieves can be modified to further attract or trap the molecules of the acidic gases. For example, surfaces of molecular sieves can be treated with materials that boost absorption preferences for targeted materials. As one specific example, a Na-A zeolite molecular sieve can be loaded with ZnO (e.g., <20% by weight), which can enhance absorption of hydrogen sulfide ($H_2S$).

FIG. 3B depicts another approach for the gasket 124. FIG. 3B shows a side, cutaway view of the gasket 124 positioned between the base deck 102 and the cover 118 to create a seal. The gasket 124 includes a portion 130 with an acid-absorbing material that is positioned between (and can contact both) the base deck 102 and the cover 118 and which can also help seal the internal cavity 128. The portion 130 with the acid-absorbing material can comprise the base gasket material and the filler that contains the acid-absorbing material.

As shown in FIG. 3B, the portion 130 with the acid-absorbing material can partially cover or contact an outer surface of the other portion of the gasket 124. In certain embodiments, the portion 130 with the acid-absorbing material can form part of the gasket 124 such that the acid-absorbing material is concentrated on the inner side of the gasket 124. In other embodiments, the portion 130 with the acid-absorbing material can create a second, physically separate gasket. Regardless, the acid-absorbing material can be said to be concentrated or positioned between the internal cavity 128 and the gasket 124. Put another way, in certain embodiments, the acid-absorbing material 130 concentrated or positioned more inward compared to or relative to the gasket 124. As such, the acid-absorbing material can be said to be concentrated or positioned on an enclosure-facing side of the gasket 124.

When the acid-absorbing material is positioned inward from the gasket 124, the acid-absorbing material is not directly exposed to the external environment of the hard disk drive 100. As such, the acid-absorbing material will not attract the types of acidic gases that the acid-absorbing material is intended to absorb and prevent leaking into the internal cavity 128 of the hard disk drive 100. In certain environments, positioning the acid-absorbing material as shown in FIG. 3B will cause a greater barrier or resistance to acidic gases compared to the approach shown in FIG. 3A and described above.

The gasket 124 shown in FIG. 3B can comprise the base material and a filler with fumed silica. The acid-absorbing material can comprise the materials and the properties described above (e.g., pore diameters, pore volumes, and surface area). For example, the acid-absorbing material can comprise silica gel or molecular sieves. Further, in certain embodiments, the silica gel or molecular sieves can be coated with an alkaline material.

As described above, using the approaches shown in FIG. 3A and FIG. 3B the hard disk drive 100 can incorporate an acid-absorbing material between the base deck 102 and top cover 118 to reduce the amount of acidic gas that enter the internal cavity 128 of the hard disk drive 100.

Figure 4:
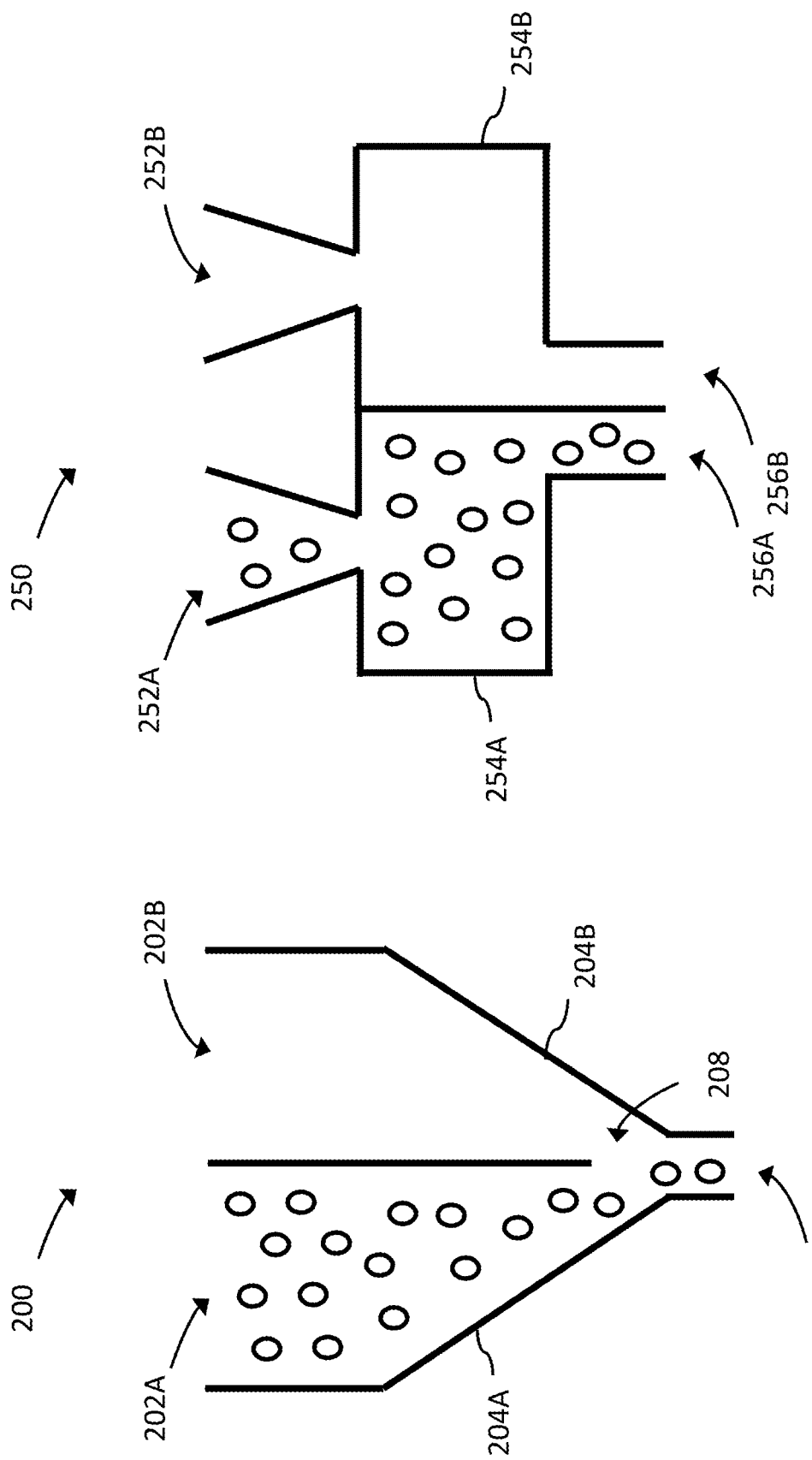
FIG. 4A and FIG. 4B show schematics of dispenser assemblies, in accordance with certain embodiments of the present disclosure.

FIGS. 4A and 4B show dispenser assemblies that can be used to dispense the gasket 124 and the acid-absorbing material described above and shown in FIG. 3B.

FIG. 4A shows a dispenser assembly 200 with a first inlet 202A and a second inlet 202B that lead respectively to a first tank 204A and a second tank 204B. The first tank 204A stores gasket material containing the acid-absorbing material (schematically indicated in FIG. 4A by the area with circles). The second tank 204B stores the gasket material without the acid-absorbing material. The gasket materials are stored in the respective tanks in liquid form.

The dispenser assembly 200 also includes a single outlet 206 or nozzle. Before the gasket materials are dispensed out of the outlet 206, the two materials can contact each other in an open zone 208 (before reaching the outlet 206) and as the materials travel through the outlet 206. Put another way, the two materials can at least partially mix together before the materials are dispensed from the outlet 206.

The gasket materials can then be dispensed onto the top cover 118 of the hard disk drive 100. The materials can be dispensed such that the acid-absorbing material is positioned inward on the top cover 118 relative to the gasket material without the acid-absorbing material. The materials can then cure on the top cover 118, and the top cover 118 can be secured to the base deck 102 such that the materials are positioned between the top cover 118 and the base deck 102.

FIG. 4B shows another type of dispenser assembly 250. The dispenser assembly 250 includes a first inlet 252A and a second inlet 252B that lead respectively to a first tank 254A and a second tank 254B. The first tank 254A stores gasket material containing the acid-absorbing material (schematically indicated in FIG. 4B by the area with circles). The second tank 254B stores the gasket material without the acid-absorbing material. The gasket materials are stored in the respective tanks in liquid form.

The dispenser assembly 250 also includes a first outlet 256A and a second outlet 256B. The gasket material with the acid-absorbing material can be dispensed from the first outlet 256A, and the gasket material without the acid-absorbing material can be dispensed from the second outlet 256B. As shown in FIG. 4B, the first outlet 256A and the second outlet 256B can be positioned next to each other so that the gasket materials can be dispensed close to each other.

The gasket materials can be dispensed onto the top cover 118 of the hard disk drive 100. The materials can be dispensed such that the acid-absorbing material is positioned inward on the top cover 118 relative to the gasket material without the acid-absorbing material. The materials can then cure on the top cover 118, and the top cover 118 can be secured to the base deck 102 such that the materials are positioned between the top cover 118 and the base deck 102.

Using the dispenser assemblies 200/250 described above, a gasket can be created such that the acid-absorbing material is concentrated at an inner portion of the gasket.

Figure 5:
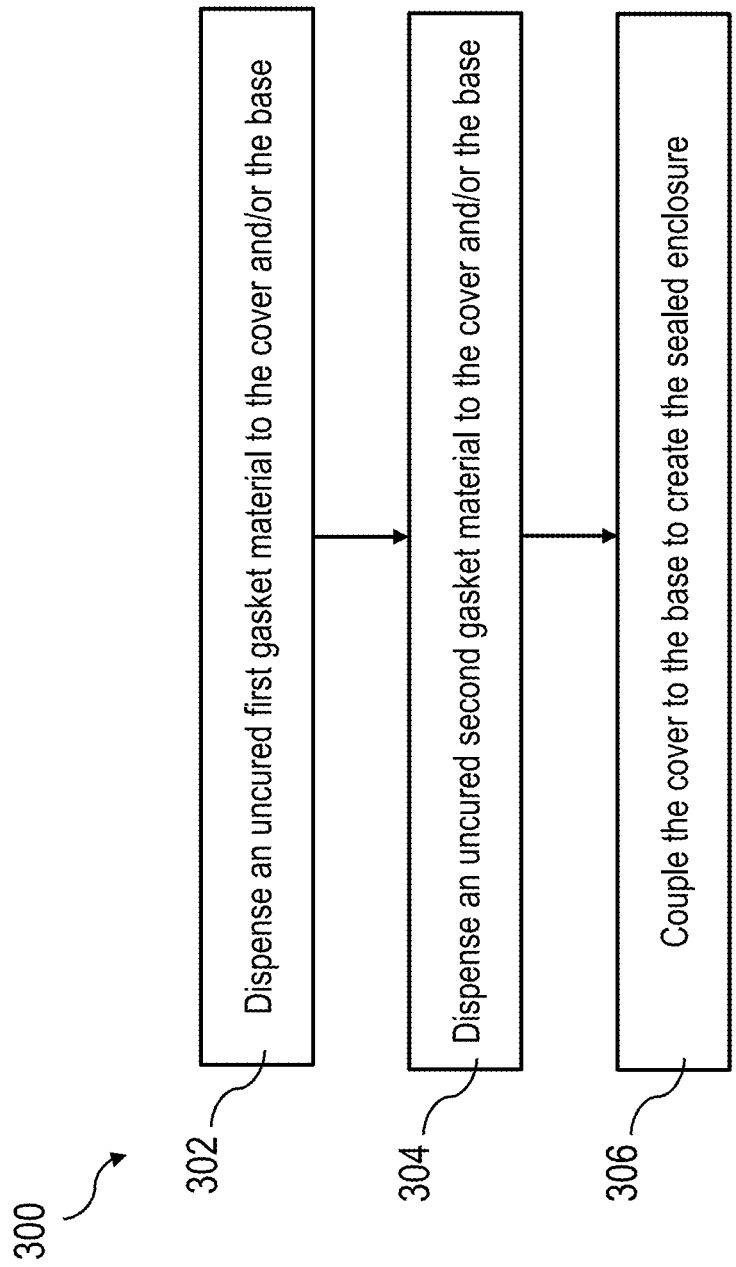
FIG. 5 shows a block diagram of sealing a hard disk drive, in accordance with certain embodiments of the present disclosure.

FIG. 5 shows a block diagram of a method 300 for sealing the hard disk drive 100. The method 300 includes dispensing an uncured first gasket material to the cover and/or the base (block 302 in FIG. 5). The first gasket material comprises a base material and a first filler with an acid-absorbing material. The method 300 also includes dispensing an uncured second gasket material to the cover and/or the base (block 304 in FIG. 5). The second gasket material comprises the base material and a second filler. The method 300 further includes coupling the cover 118 to the base deck 102 to create the sealed enclosure (block 306 in FIG. 5).

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A device comprising:
    a cover;
    a base coupled to the cover to create an enclosure; and
    a form-in-place-gasket (FIPG) positioned between the cover and the base to create a seal, the FIPG comprising an acid-absorbing material, the acid-absorbing material comprising a silica gel, which comprises a porous material.

2. The device of claim 1, wherein the acid-absorbing material is capable of absorbing sulfur dioxide, hydrogen halogen, hydrogen sulfide, and nitrous oxide.

3. The device of claim 1, wherein the silica gel has a pore volume of 0.70-0.80 $m^3/g$.

4. The device of claim 1, wherein the silica gel comprises pores having diameters up to 5 nm.

5. The device of claim 1, wherein the silica gel has a surface area of 500-800 $m^2/g$.

6. The device of claim 1, wherein the silica gel is coated with an alkaline material.

7. The device of claim 1, wherein the FIPG comprises a filler comprising 10-50% of the acid-absorbing material by weight.

8. The device of claim 1, wherein the acid-absorbing material is uniformly distributed within the FIPG.

9. The device of claim 1, wherein the acid-absorbing material is concentrated on an enclosure-facing side of the gasket.

10. The device of claim 1, wherein the acid-absorbing material is not directly exposed to an external environment of the device.

11. The device of claim 1, wherein the FIPG includes a base material that comprises rubber.

12. A device comprising:
    a cover;
    a base coupled to the cover to create an enclosure; and
    a gasket positioned between the cover and the base to create a seal, the gasket comprising a base material and a filler that comprises silica gel, which is coated with an alkaline material.

13. The device of claim 12, wherein the silica gel is concentrated on an enclosure-facing side of the gasket.

14. The device of claim 12, wherein the silica gel is capable of absorbing sulfur dioxide, hydrogen halogen, hydrogen sulfide, and nitrous oxide.

15. The device of claim 12, wherein the device is a hard disk drive.

16. The device of claim 12, wherein the silica gel comprises pores having diameters of 3-5 nm.

17. A method for forming a sealed enclosure between a cover and a base of an electronic device, the method comprising:
- dispensing an uncured first gasket material to the cover and/or the base, the first gasket material comprising a base material and a first filler with an acid-absorbing material;
- dispensing an uncured second gasket material to the cover and/or the base, the second gasket material comprising the base material and a second filler; and
- coupling the cover to the base to create the sealed enclosure.

18. The method of claim 17, wherein the first gasket material and the second gasket material are both dispensed from a shared outlet.

19. The method of claim 17, wherein the first gasket material and the second gasket material are dispensed from separate outlets.

* * * * *